United States Patent Office 3,690,905
Patented Sept. 12, 1972

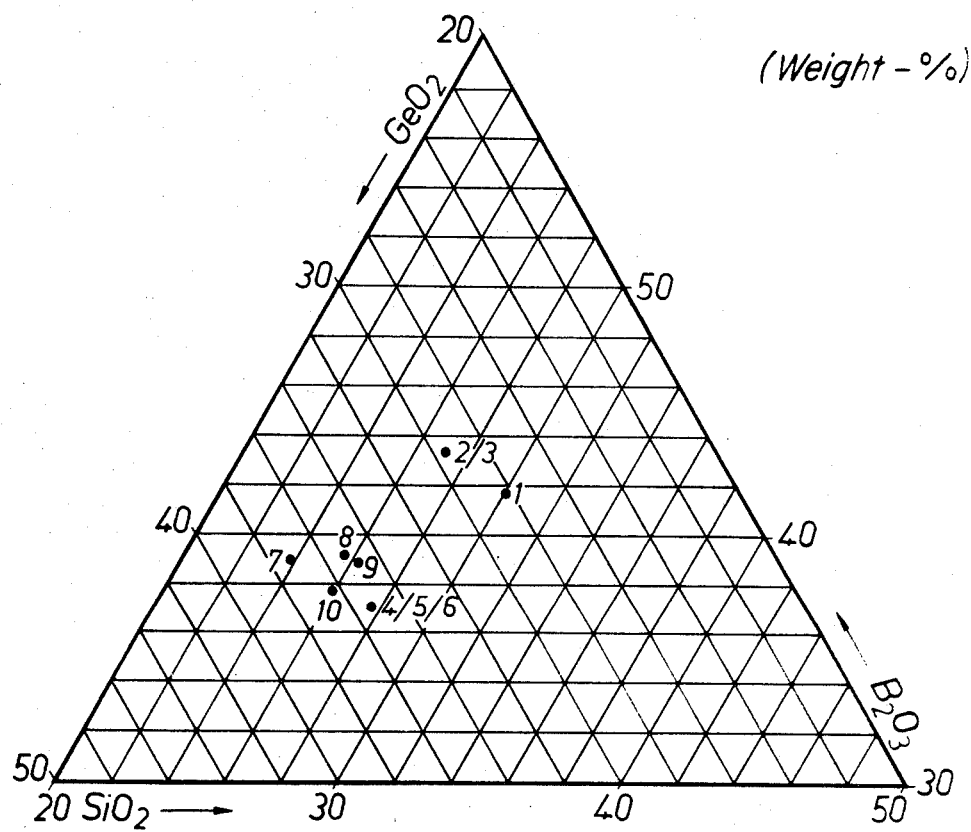

3,690,905
OPTICAL GLASS HAVING ANOMALOUS PARTIAL DISPERSION
Heinz Bromer, Hermannstein, Norbert Meinert and Johann Spincic, Wetzlar, and Hans Staaden, Stockhausen, Germany, assignors to Ernst Leitz G.m.b.H., Wetzlar, Germany
Filed May 20, 1971, Ser. No. 145,321
Claims priority, application Germany, May 22, 1970, P 20 24 912.1
Int. Cl. C03c *3/08, 3/33, 3/00*
U.S. Cl. 106—47 Q                                2 Claims

ABSTRACT OF THE DISCLOSURE

Novel germanium-containing optical glass compositions having anomalous partial dispersion and improved chemical properties containing glass batch constituents ranging in weight percent: 37–50% of glass formers selected from the group of metal oxides consisting of $SiO_2$, $B_2O_3$ and $GeO_2$; at least 6% of an alkali metal oxide, at least 2% of an oxide selected from the group consisting of ZnO and CdO, up to 13% of an oxide selected from the group consisting of $Al_2O_3$ and $La_2O_3$, 3–8% of $ZrO_2$ and 25–42% of an oxide selected from the group consisting of $Ta_2O_5$ and/or $WO_3$ or $Nb_2O_5$ with at least 20% of the oxide of tantalum being present. The refractive indices ($\eta_e$) of such glasses range approximately from 1.646 to 1.733 while the Abbe values ($\nu_e$) range between 44.8 and 37.1 and the partial dispersions ($\Delta\nu_e$) are from —3.0 to —6.4.

BACKGROUND OF THE INVENTION

In the U.S. Pat. 3,529,980 optical crown glasses are disclosed which are molten from a batch composition containing as the glass former only $SiO_2$ and $B_2O_3$. The glasses have indices of refraction ($\eta_e$) ranging between 1.54 and 1.64 with an anomalous negative partial dispersion ($\Delta\nu_e$) between —3 and —14. However, optical glasses having about the same anomalous partial dispersion but in combination with a considerably higher index of refraction have often been required by the lens designers. It is therefore an object of the present invention to provide such glasses with a high index of refraction.

SUMMARY OF THE INVENTION

According to the invention the above stated object is attained by adding a considerable amount of germanium dioxide ($GeO_2$) to the batch composition as a glass former.

As a matter of fact, $GeO_2$ is already known to have glass forming properties, and glasses consisting only of $GeO_2$ have already been manufactured because of their specific optical properties in the range of the infrared light. Further, for melting particular infrared light transmitting glasses $SiO_2$ has already been replaced partially or totally by $GeO_2$.

However, if the optical glasses are required to have certain well defined optical properties in the range of the visible light, as for example a certain index of refraction ($\eta_e$), Abbe number ($\nu_e$) and an anomalous partial dispersion ($\Delta\nu_e$), and further, if the glasses are to be reproducible and to be molten without difficulties, then the glasses must be molten from certain specific batch compositions from which glasses are obtained which will be resistant to chemical influences.

According to the invention such glasses will be obtained from batch compositions which consist essentially of the following constituents given in percent by weight:

(a) 37–50% of the glass formers $SiO_2$, $B_2O_3$, and $GeO_2$ of which $SiO_2$ is present in an amount of at least 8%, $B_2O_3$ is present in an amount of at least 12% and $GeO_2$ is present in an amount of at least 10%;

(b) at least 6% of the alkali metal oxides $Li_2O$ and/or $Na_2O$ with the ratio of the weight of $Li_2O$ and $Na_2O$ being approximately 6 in cases where both $Li_2O$ and $Na_2O$ are present;

(c) at least 2% of the oxides of elements selected from the group consisting of zinc and cadmium;

(d) 0–13% of the oxides of elements selected from the group consisting of aluminum and lanthanum;

(e) 3–8% of zirconium dioxide $ZrO_2$;

(f) 25–42% of the oxide of tantalum or of the oxides of the elements selected from a group consisting of tantalum and tungsten and niobium respectively, with at least 20% of the oxide of tantalum $Ta_2O_5$ being present.

Within the described ranges preferred glasses are molten from a batch composition consisting essentially of:

(a) 37–50% of the glass formers $SiO_2$, $B_2O_3$, and $GeO_2$ of which $SiO_2$ is at least 8%, $B_2O_3$ is at least 14% and $GeO_2$ is 14%;

(b) 6–8% of the oxides of the alkali metals $Li_2O$ and/or $Na_2O$ with the ratio of the weight of $Li_2O$ and $Na_2O$ being approximately 6 in cases where both $Li_2O$ and $Na_2O$ are present;

(c) 3.1% of zinc oxide ZnO;

(d) up to 13% of the oxides of the elements selected from a group consisting of aluminum and lanthanum;

(e) 3–8% of the zirconium dioxide $ZrO_2$;

(f) 25–42% of the oxide of tantalum or of the oxides of the elements selected from a group consisting of tantalum and tungsten with at least 20% of the oxide of tantalum $Ta_2O_5$ being present.

BRIEF DESCRIPTION OF THE DRAWING

The figure represents a ternary phase diagram of the glass formers $SiO_2$, $B_2O_3$, and $GeO_2$ wherein the amount of each ingredient is given in percent by weight. For the purpose of this diagram the total amount of the glass formers was made to equal 100%, i.e.

$$\Sigma(SiO_2 + B_2O_3 + GeO_2) = 100\%$$

and the calculated percent by weight of these glass formers is given in the Table 1 below:

TABLE 1
(In percent by weight)

| Melt Number | 1 | 2/3 | 4/5/6 | 7 | 8 | 9 | 10 |
|---|---|---|---|---|---|---|---|
| $SiO_2$ | 30.1 | 27.2 | 27.6 | 23.8 | 25.6 | 26.2 | 25.9 |
| $B_2O_3$ | 41.6 | 43.4 | 37.0 | 39.0 | 39.2 | 39.8 | 37.8 |
| $GeO_2$ | 28.3 | 29.4 | 35.4 | 37.2 | 35.2 | 34.9 | 36.3 |
| Σ | 100.0 | 100.0 | 100.0 | 100.0 | 100.0 | 100.0 | 100.0 |

DESCRIPTION OF THE PREFERRED EMBODIMENTS

The results of a number of glass melts are shown in the following table which also gives for each molten glass the index of refraction $\eta_e$, the Abbe number $\nu_e$, and the partial dispersion $\Delta\nu_e$. By these melts it is proven that, in the sense of the invention, $GeO_2$-containing glasses can be molten which have a considerably higher index of refraction than those disclosed in the U.S. Pat. 3,529,980. The lens designer can, thus, select the glass types from a wider range of specific glasses.

TABLE 2
(In percent by weight)

| Melt number | 1 | 2 | 3 | 4 | 5 | 6 | 7 | 8 | 9 | 10 |
|---|---|---|---|---|---|---|---|---|---|---|
| $SiO_2$ | 14.9 | 12.9 | 12.9 | 10.9 | 10.9 | 10.9 | 8.9 | 10.2 | 10.5 | 10.0 |
| $B_2O_3$ | 20.6 | 20.6 | 20.6 | 14.6 | 14.6 | 14.6 | 14.6 | 15.6 | 15.6 | 14.6 |
| $GeO_2$ | 14.0 | 14.0 | 14.0 | 14.0 | 14.0 | 14.0 | 14.0 | 14.0 | 14.0 | 14.0 |
| $Li_2O$ | 6.8 | 6.8 | 6.8 | 6.8 | 6.8 | 6.8 | 6.8 | 7.3 | 7.0 | 7.0 |
| $Na_2O$ | 1.1 | 1.1 | 1.1 | 1.1 | 1.1 |  | 1.1 |  |  |  |
| $ZnO$ | 3.1 | 3.1 | 3.1 | 3.1 |  | 3.1 | 3.1 | 3.1 | 3.1 | 3.1 |
| $La_2O_3$ | 1.3 | 1.3 | 1.3 | 1.3 |  | 1.3 | 1.3 |  |  |  |
| $Al_2O_3$ | 9.0 | 11.0 | 9.0 | 1.5 | 1.5 | 1.5 | 1.5 |  |  | 1.5 |
| $ZrO_2$ | 3.4 | 3.4 | 3.4 | 5.4 | 6.7 | 6.5 | 7.4 | 8.0 | 8.0 | 8.0 |
| $Ta_2O_5$ | 25.8 | 20.8 | 22.8 | 22.8 | 22.8 | 22.8 | 22.8 | 22.8 | 22.8 | 22.8 |
| $WO_3$ |  | 5.0 | 5.0 | 18.5 | 18.5 | 18.5 | 18.5 | 18.5 | 19.0 | 19.0 |
| $\eta_e$ | 1.6462 | 1.6460 | 1.6521 | 1.7221 | 1.7212 | 1.7255 | 1.7323 | 1.7330 | 1.7330 | 1.7295 |
| $\nu_e$ | 44.8 | 43.6 | 44.0 | 37.8 | 37.6 | 37.6 | 37.2 | 37.3 | 37.1 | 37.2 |
| $\Delta\nu_e$ | -3.3 | -4.7 | -6.4 | -4.4 | -5.0 | -4.5 | -4.5 | -3.6 | -3.0 | -3.4 |

A melt is completed by filling 1-2 kg. of the mixed batch particles into a platinum crucible and melting the constituents at 1300° C. The temperature is then raised to 1400° C. and the melt is homogenized by continuous stirring over a period of one hour. Thereafter, the temperature is lowered to 1250° C. while still stirring and further to 800° C. where the molten material is cast into a preheated mold.

The invented glasses are easy to melt bubble-free and without streaks. They are highly resistant against atmospheric influences.

The seven points recorded in the diagram correspond to the melt examples described in the Tables 1 and 2.

What is claimed is:

1. An optical glass composition consisting essentially of silicon dioxide $SiO_2$, boron trioxide $B_2O_3$, germanium dioxide $GeO_2$, alkali metal oxides, zirconium dioxide $ZrO_2$, and the oxides of tantalum, tungsten, and niobium, said glass composition having a refractive index ($\eta_e$) between about 1.64 and about 1.74 and an Abbe value ($\nu_e$) ranging between about 37.1 and about 44.8, and a negative partial dispersion value ($\Delta\nu_e$) ranging between about −3.0 and about −6.4 the glass batch constituents of said glass composition being present therein in the following weight percent ranges:

(a) 37% to 50% of the glass formers silicon dioxide $SiO_2$, boron trioxide $B_2O_3$, and germanium dioxide $GeO_2$, of which silicon dioxide is present in an amount of at least 8%, boron trioxide is present in an amount of at least 12%, and germanium dioxide is present in an amount of at least 10%;

(b) at least 6% of the alkali metal oxides selected from the group consisting of lithium oxide $Li_2O$, sodium oxide $Na_2O$, and mixtures thereof, with the ratio of the weights of lithium oxide and sodium oxide being about 6 in cases where both lithium oxide and sodium oxide are present;

(c) at least 2% of the oxides of an element selected from the group consisting of zinc and cadmium;

(d) 0% to 13% of the oxides of an element selected from the group consisting of aluminum and lanthanum;

(e) 3% to 8% of zirconium dioxide $ZrO_2$; and (f) 25% to 42% of the oxides of an element selected from the group consisting of tantalum, tungsten, and niobium, with at least 20% of the oxide of tantalum $Ta_2O_5$ being present in said glass composition.

2. An optical glass composition as claimed in claim 1, wherein the glass batch constituents of said glass composition are present therein in the following weight percent ranges:

(a) 37% to 50% of the glass formers silicon dioxide $SiO_2$, boron trioxide $B_2O_3$, and germanium dioxide $GeO_2$, of which silicon dioxide is present in an amount of at least 8%, boron trioxide is present in an amount of at least 14%, and germanium dioxide is present in an amount of 14%;

(b) 6% to 8% of the alkali metal oxides selected from the group consisting of lithium oxide $Li_2O$, sodium oxide $Na_2O$, and mixtures thereof, with the ratio of the weights of lithium oxide $Li_2O$ and sodium oxide $Na_2O$ being about 6 in cases where both lithium oxide and sodium oxide are present;

(c) 3.1% of zinc oxide $ZnO$;

(d) up to 13% of the oxides of an element selected from the group consisting of aluminum and lanthanum;

(e) 3% to 8% of zirconium dioxide $ZrO_2$; and (f) 25% to 42% of the oxides of an element selected from the group consisting of tantalum and tungsten whereby at least 20% of the oxide of tantalum $Ta_2O_5$ are present in said glass composition.

References Cited

UNITED STATES PATENTS 3,529,980   9/1970   Brömer et al. _____ 1156—47 Q

JAMES E. POER, Primary Examiner

M. L. BELL, Assistant Examiner

U.S. Cl. X.R.

106—54

UNITED STATES PATENT OFFICE
CERTIFICATE OF CORRECTION

Patent No. 3,690,905  Dated September 12, 1972

Inventor(s) HEINZ BROEMER, NORBERT MEINERT, JOHANN SPINCIC

It is certified that error appears in the above-identified patent and that said Letters Patent are hereby corrected as shown below:

Drawing page, line 1; column 1, line 4: The name of the inventor "Bromer" should be changed to -- Broemer --; column 1, line 27, line 38, line 62; column 2, line 66; Table 2; column 3, line 43: "$\eta_e$" should read -- $n_e$ --.

Signed and sealed this 3rd day of April 1973.

(SEAL)
Attest:

EDWARD M. FLETCHER, JR.
Attesting Officer

ROBERT GOTTSCHALK
Commissioner of Patents